United States Patent [19]

Lanz

[11] 4,012,949
[45] Mar. 22, 1977

[54] MILES PER GALLON COMPUTER SYSTEM MEANS

[76] Inventor: Walter J. Lanz, 82 Grant Ave., East Rockaway, N.Y. 11518

[22] Filed: Mar. 22, 1976

[21] Appl. No.: 669,149

[52] U.S. Cl. .................................. 73/114; 235/194
[51] Int. Cl.² ......................................... G01F 9/00
[58] Field of Search ................ 73/114; 235/150.52, 235/194, 195, 196

[56] References Cited
UNITED STATES PATENTS

| | | | |
|---|---|---|---|
| 3,040,983 | 6/1962 | Bigelow | 235/196 X |
| 3,118,302 | 1/1964 | Fathauer | 73/114 |
| 3,908,451 | 9/1975 | Walker et al. | 73/114 |

Primary Examiner—Jerry W. Myracle

[57] ABSTRACT

A miles-per-gallon computing device in which a chain of pulses is produced with the pulse spacing being a function of one variable and the pulse width being a function of the other variable. The resulting pulse chain is then integrated to obtain the output value.

3 Claims, 2 Drawing Figures

MILES PER GALLON COMPUTER SYSTEM MEANS

This invention relates to an electronic computer system for multiplying and dividing two variable signals, each of which represents or is a function of a variable parameter such as speed, or rate of fuel flow. The inputs to the computer consist of a chain of electrical pulses representing one variable, and a variable capacitance or resistance representing the other. The output of the computer, in the form of pulses, can be fed to any data system or can be fed to a simple voltmeter or microammeter for visual display.

The incoming pulses vary in repetition rate as a direct function of one variable. The output pulses vary in repetition rate identically with the input pulses. The height of output pulses is constant. The width of output pulses varies directly with change of a capacitance or resistance which varies directly or inversely with the other variable. The output of the computer feeds an indicator which responds directly to the average voltage of the pulses with respect to time and indicates on a calibrated scale, the solution of the computation.

The following U.S. Pat. Nos.: 3,537,302, 3,549,868, 3,635,079, 3,673,863, 3,908,451, 3,916,682, 3,921,444, 3,926,045 and 3,930,408 and others, represent considerable effort during recent years to develop a computer means for displaying miles per gallon performance in an automobile. The need for such a system is widespread, created by the desire to compare the performance of various automobiles with each other, as well as to evaluate performance of a particular vehicle, using different types and brands of fuel. Also, there is a third category which involves use of a suitable miles per gallon indicator in conjunction with vernier controls such as for engine timing and fuel air mixture ratio, so that peak performance for a vehicle may be assured.

This invention provides for a new system with the following features incorporated:
Continual display
Practical in nature, simple to manufacture and install
Low cost
Accuracy
Reliability

DESCRIPTION

The system consists of two transducers, a computer (in electronic terminology — a monostable retriggerable multivibrator), a constant D.C. voltage supply, and an indicator.

The following detail description, for purpose of clarification, deals specifically with a miles per gallon computer — indicator system as related to an automobile. (Other applications will be mentioned later and set forth in Claims).

Figure 1:
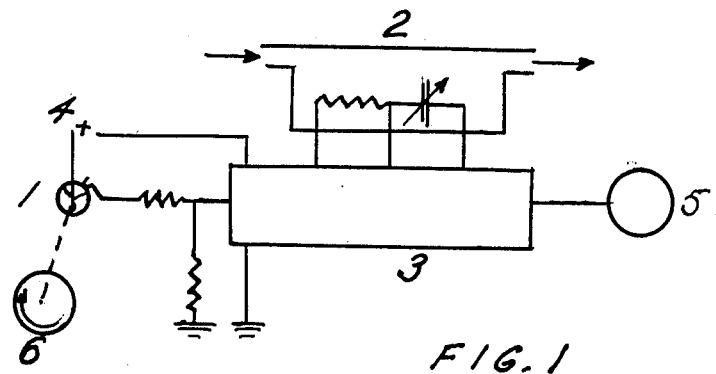
FIG. 1 shows the components which are interconnected by electrical wiring.

A transducer, 1, is simply a commutator or other electrical device which is mechanically or electrically coupled to the speedometer cable or speedometer, 6, so that it provides a chain of pulses whose repetition rate varies directly with the speed of the vehicle. These pulses are supplied to the computer, 3, input to provide "triggering." A D.C. voltage, 4, applied to the transducer provides sufficient pulse amplitude. Shape or amplitude of pulses is not critical since triggering occurs either by pulse rise or by pulse decay depending on which computer input is selected.

A second transducer, 2, consisting of a fixed resistor and a variable capacitor, varies its capacity inversely in proportion to fuel flow rate change, being inserted in the fuel supply line. This variation is accomplished by causing change in dielectric thickness, or plate separation. This is accomplished by means of a paddle attached to one set of plates and which moves against a spring as a result of a dynamic force acting on it caused by flow of fuel. An alternate method exists wherein one set of plates is moved by a diaphragm, bourdon tube or bellows subjected to differential pressure taken across an orifice through which the fuel flows. The values of capacitance and resistance are selected to be compatible with the computer, 3, requirements as specified by the manufacturer.

It is not the intention of this disclosure to claim new improvement for transducers since the types mentioned presently exist, or can readily be designed in accordance with established engineering practice.

A computer, 3, receives information from the two transducers, 1, and 2, and also is supplied by a regulated D.C. voltage, 4.

The computer, 3, is a monostable retriggerable multivibrator. The unit is on the market as an integrated circuit, manufactured by various companies. The Fairchild Semiconductor, 464 Ellis St., Mountain View, Calif. device No. 96L02PC is suitable for use in this system. One or both transducers may be combined with this computer to form a single package for convenience, and also to reduce noise pickup which could be present unless length of wiring from the capacitor-resistor transducer is kept to a minimum.

The computer output consists of a chain of pulses whose amplitude is constant, whose repetition rate is identical with that of input pulses from transducer, 1, and the pulse widths vary with the value of the variable capacitor in transducer, 2. Since the capacitor value in transducer, 2, varies inversely with fuel flow rate, the output pulse width does likewise. Average output voltage is proportional to (pulse frequency)×(pulse height)×(pulse width) and hence is proportional to vehicle speed divided by fuel flow rate.

$$E = k \frac{\text{Miles per hour}}{\text{Gallons per hour}} = k' \frac{\text{Miles}}{\text{Gallon}} \text{ for any instant}$$

An indicator, 5, receives the output pulses from the computer, 3. The indicator is a simple voltmeter or microammeter whose scale has been replaced with a scale calibrated in miles per gallon. Due to sufficiently high pulse rate, the meter has sufficient damping to respond only to average voltage, although a simple filter may be provided between computer, 3, and indicator, 5, should it be found necessary to provide additional damping, especially to counter rapid transients such as would result from sudden application of brakes, or from rapid changes in throttle (accelerator) position.

The design of this system is simplified based on assuming finite limits of speed range, fuel flow rate range, and MPG (miles per gallon) range. As pulse widths increase due to decrease in fuel flow rate, a condition is approached (depending also on speed and pulse rate), which results in a continuous D.C. output from the computer. At this point, the indicator reading has reached its limit, and beyond this point, no useful information is obtained since it also approaches infinite miles per gallon condition, such as for near zero fuel flow while coasting down hill. Likewise, on the low end, no useful purpose is achieved by continuing the computation all the way to zero such as when a car is standing still with motor idling. All this is mentioned herewith to explain simplification of transducer design as a result of selecting practical and useful ranges for input and output variables.

Figure 2:
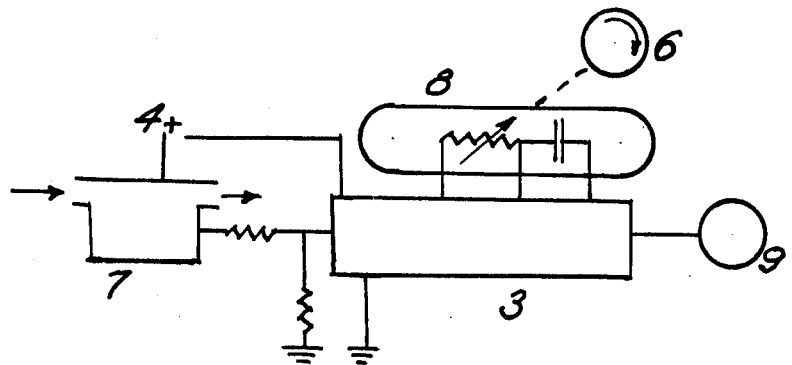
FIG. 2 shows a second embodiment of the computing device.

FIG. 2 shows an alternate system to the one shown in FIG. 1. It consists of the following:

Transducer, 7, is a fuel flow transducer which provides an output chain of electrical pulses whose repetition rate is proportional to rate of fuel flow passing through it. It is installed in the fuel line to the engine. This type of flowmeter is commonly in use. This output is fed to input of computer, 3.

Transducer, 8, is mechanically or electrically linked to the speedometer cable or to the speedometer, 6, in such a way as to move a variable resistance or capacitance in inverse proportion to vehicle speed. It contains both capacitance and resistance elements, one of which is fixed. As shown in FIG. 2 it consists of a variable resistor and fixed capacitor. One specific design involves a shaped potentiometer mounted on the speedometer needle shaft. Again, as above, the values of resistance and capacitance are selected to be compatible with computer, 3, requirements, as specified by the manufacturer.

This system, FIG. 2, is similar to that of FIG. 1 in that it uses the same computer, 3, (monostable retriggerable multivibrator). The computer and the vehicle speed transducer, 8, can be contained in one package and may even be incorporated in the speedometer housing.

In this system arrangement, the computer output consists of a chain of pulses whose repetition rate is identical with rate of fuel flow pulses from transducer, 7. The pulse amplitude is constant. The pulse width varies with the variation of the transducer, 8, resistance, and inversely with vehicle speed variation. The output voltage average is proportional to (pulse frequency)×(pulse amplitude)×(pulse width) and hence is proportional to fuel flow rate divided by vehicle speed:

$$E = k \frac{\text{Gallons per hour}}{\text{Miles per hour}} = k' \frac{\text{Gallons}}{\text{Mile}} \text{ for any instant}$$

Since this is an indication of performance, the scale of indicator, 9, is calibrated accordingly in gallons per mile. (However, if miles per gallon indicator scale is preferable, it can be made up as the inverse of the gallons per mile scale. High voltage output would read low miles per gallon, and low voltage output would read high miles per gallon).

At the outset, it was stated that for the purpose of clarification, the description was specifically for a system relating to an automobile. It can likewise be used for the following applications:
 a. Marine use — water vehicles, where fuel flow rate and water speed transducers provide computer inputs.
 b. Trucks — similar to systems described for automobiles.
 c. Aircraft — where fuel flow rate and air speed transducers provide computer inputs.

The accuracy of the system as used in automobiles is good, since accurate transducers can be selected or designed. The greatest error may be the result of improper tire inflation pressure. This would be the same degree of error occurring in standard speedometer and odometer readings. This error can be minimized by periodic check and adjustment of tire inflation air pressure.

I Claim:
1. A new computer system means which provides accurate capability for both multiplication and division of two variable quantities and for presenting the result continually on a display indicator, comprising:
 a first transducer means for converting one variable quantity into an output of a series of a series of electrical pulses varying in frequency;
 a second transducer means for converting a second variable quantity into a varying output combination of electrical capacitance and resistance;
 a computer means, technically termed a "monostable retriggerable multivibrator," which, being connected electrically to the outputs of the said first and second transducers, receives pulses from the first transducer and capacitance-resistance information from the second transducer, and provides an output series of pulses constant in amplitude, varying in frequency identically with the frequency of the pulses supplied by the first transducer, and varying in width in proportion to the variation of the capacitance-resistance information supplied by the second transducer, the resulting output voltage averaged with respect to time, being the arithmetical product of pulse amplitude, pulse frequency and pulse width;
 a regulated d.c. voltage source connected to the said computer which provides energy for its operation and establishes the magnitude of the constant amplitude of the computer output pulses;
 an indicator means electrically connected to the computer output, whose dynamic damping causes it to respond to the average voltage of the computer output.

2. The computer system means of claim 1 further including:
 a connection between the first transducer and a component of any liquid fuel operated automotive vehicle with the result that the transducer output pulses vary in frequency directly with the vehicle speed in miles per hour, as a feature of the transducer design, and are applied to the computer input to which the transducer is connected, causing the computer output pulses to vary in frequency as the vehicle speed varies;
 a connection between the second transducer and the liquid fuel supply of said automotive vehicle with the result that the transducer output, which is a combination of capacitance and resistance, varies inversely with the rate of fuel flow in gallons per hour, as a feature of the transducer design, and said output is applied to the computer to which it is connected, causing the computer output pulse widths to vary inversely with the rate of fuel flow in gallons per hour, and thus in turn, causing the average voltage of the computer output to vary with miles travelled per gallon of fuel consumed for small finite periods of time; and a scale provided on the indicator which is calibrated in miles per gallon so that an indication of miles per gallon will be continually displayed as the indicator responds to the average voltage of the computer output to which it is attached.

3. The computer system means of claim 1 further including:

a connection between the first transducer and the liquid fuel supply of any liquid fuel operated automotive vehicle with the result that the transducer output pulses vary in frequency directly with the rate of fuel flow in gallons per hour, as a feature of the transducer design, and are applied to the computer input to which the transducer is connected, causing the computer output pulses to vary in frequency directly as the rate of fuel flow varies;

a connection between the second transducer and a component of said automotive vehicle with the result that the transducer output, which is a combination of electrical capacitance and resistance, varies inversely with the vehicle speed in miles per hour, as a feature of the transducer design, and said output is applied to the computer to which the transducer is connected, causing the computer output pulse widths to vary inversely with vehicle speed in miles per hour, and thus in turn, causing the average voltage of the computer output to vary with gallons of fuel consumed per mile of distance travelled and inversely, with distance in miles per gallon of fuel, for small finite periods of time; and a scale provided on the indicator which is calibrated in miles per gallon so that an indication of miles per gallon will be continually displayed as the indicator responds to the average voltage of the computer output to which it is attached.

* * * * *